United States Patent
Meeks et al.

(10) Patent No.: US 7,095,330 B2
(45) Date of Patent: Aug. 22, 2006

(54) DISPOSABLE LIQUID LEVEL SENSOR HAVING A VIRTUAL RING

(75) Inventors: John Meeks, Cincinnati, OH (US); Edward R. Chamberlin, Cincinnati, OH (US)

(73) Assignee: Standex International Corporation, Salem, NH (US)

( * ) Notice: Subject to any disclaimer, the term of this patent is extended or adjusted under 35 U.S.C. 154(b) by 154 days.

(21) Appl. No.: 10/928,636

(22) Filed: Aug. 27, 2004

(65) Prior Publication Data

US 2005/0088309 A1    Apr. 28, 2005

Related U.S. Application Data

(63) Continuation-in-part of application No. 10/823,935, filed on Apr. 14, 2004, which is a continuation-in-part of application No. 10/410,836, filed on Apr. 10, 2003, now Pat. No. 6,727,822, which is a continuation-in-part of application No. 10/184,010, filed on Jun. 27, 2002, now Pat. No. 6,624,755.

(51) Int. Cl.
    *G08B 21/00* (2006.01)

(52) U.S. Cl. ............... 340/620; 340/612; 340/618; 73/32 R; 73/290 R; 73/291; 73/301; 73/304 R (58) Field of Classification Search ............... 340/612, 340/618–621, 623, 624, 626; 73/32 R, 290 R, 73/291, 304 R
See application file for complete search history.

(56) References Cited

U.S. PATENT DOCUMENTS

| | | | | |
|---|---|---|---|---|
| 3,874,223 A | * | 4/1975 | Miyazaki et al. | ............ 73/32 R |
| 5,002,201 A | * | 3/1991 | Hancock et al. | ............... 222/61 |
| 5,060,512 A | * | 10/1991 | Kanashige et al. | ........... 73/301 |

* cited by examiner

*Primary Examiner*—Jeffery Hofsass
*Assistant Examiner*—Samuel J. Walk
(74) *Attorney, Agent, or Firm*—William B. Ritchie (57) ABSTRACT

A liquid level sensor for standard bottles containing highly viscous materials such as gels so that the bottles may be inserted into an appliance to alert a user when the bottle is empty. The holder conveniently locates the bottle in the holder which includes insert molded contacts, wire harness and seal piercing mechanism. The bottle holder will universally fits into most appliances and machines. The invention enables the use of standard bottles are liquid reservoirs such that the bottle can be discarded when empty.

5 Claims, 9 Drawing Sheets

SECTION B-B

SECTION A-A

SECTION C-C

DISPOSABLE LIQUID LEVEL SENSOR HAVING A VIRTUAL RING

This application is a continuation-in-part of U.S. patent application Ser. No. 10/823,935, filed on Apr. 14, 2004, which is a continuation-in-part of U.S. patent application Ser. No. 10/410,836, filed Apr. 10, 2003, now issued as U.S. Pat. No. 6,727,822 on Apr. 27, 2004, which is a continuation-in-part of U.S. patent application Ser. No. 10/184,010, filed Jun. 27, 2002, now issued as U.S. Pat. No. 6,624,755 on Sep. 23, 2003.

FIELD OF THE INVENTION

This invention relates to sensing the liquid level in container of a highly viscous liquid, in particular, the use of a sensor integrated into standard disposable bottles to determine the level of a liquid contained within a vessel is sufficient for a particular task such as washing dishes, laundry, etc.

BACKGROUND OF THE INVENTION

The use of devices to indicate the level of liquid within a tank or container is well known in the art. The need for knowing whether a liquid in a container is above or below a predetermined level is found in many very different situations. Typical of those situations where the liquid level must not be permitted to fall below a predetermined level are found in automobile radiators, windshield washer containers or oil in an engine crankcase. The situation where the level can be too high is also common such as found with a recreational vehicle holding tank. Applications for such equipment is also found in industry where frequently the liquid in question is extremely caustic as experienced with chemical reagent reservoirs which must be filled once the chemical has fallen below a particular amount in order to keep a process running.

A typical float-type of liquid level sensor is disclosed in U.S. Pat. No. 4,386,337, issued to Todd on May 31, 1983. This device is said to be useful for measuring the level of oil in an engine crankcase or transmission fluid in a reservoir. An electrically conductive float disposed within an encapsulator and movably responsive to the liquid level is provided. This movement is then determined. The problem associated with sludge buildup resulting in shorts bypassing the proper electrical pathways is not directly discussed. While Todd does suggest that by having his encapsulator with open upper and lower ends provides for self-flushing of debris, it is unclear how this can inhibit or stop the problems associated with residue formation, particularly as found in older systems.

The type of devices used to measure the liquid level also varies substantially. The use of floats, changes in capacitance, optical readers, weight measurements of the liquid are just a few examples of techniques that have been adopted to serve as an indicator of the surface level of a liquid. Some devices have attempted to utilize non-invasive measures, that is, a sensor that is outside of the liquid container.

Representative of this genre is U.S. Pat. No. 4,749,988, issued to Berman et al. on Jun. 7, 1988. The '988 Patent discloses the use of a pair of conductive band electrodes oriented in parallel so that the gap between the electrodes corresponds to the liquid surface level to be measured. The change in capacitance between the electrodes as the liquid level rises and falls serves as the indicator. While this device solves the corrosive problem found in processing industries using materials in liquid form, its use is limited to containment vessels which have sufficient outside room to put the sensor in place. Further, this type of sensor is expensive to manufacture in that it must be shaped to correspond to the particular shape of the vessel being used. Also, the thickness and material used for the vessel can also appreciably impact the accuracy and sensitivity of the device. Whether this will also solve the problem of residue buildup on the inside of he container is not know as Berman et al. does not discuss this issue.

U.S. Pat. No. 5,315,872, issued to Moser on May 31, 1994, discloses a liquid level sensor for an electrically conductive liquid. The device requires the use of an electrically conductive material for constructing the tank. Thus, many commonly used containers are unsuitable for use with this device without having substantial additional expense. A voltage source supplies an electrical charge to the tank walls, with ground potential being supplied to the liquid contained therein. The capacitance between the tank walls and liquid varies with the volume of liquid in the tank. The problem of false "full" readings is not discussed.

One of the potentially simplest and least expensive methods for the measurement of the level of a liquid is the use of an electrically conductive liquid as a part of a resistive circuit to ascertain the level. Representative of this genre is found in U.S. Pat. No. 4,277,773, issued to Blatnik on Jul. 7, 1981. This reference discloses a device for measuring the level of cooling liquid within a radiator. The radiator is grounded and an insulated probe is installed in the radiator and measures the level via interconnecting the sensor with the ground to obtain a conductivity measurement. A second sensor is provided to measure a hot liquid level in the same manner. While this device is simple and inexpensive to build, no protection against false "full" readings due to the accumulation of conductive sludge or other residue is disclosed or suggested.

U.S. Pat. No. 5,719,556, issued to Albin et al. on Feb. 17, 1998, discloses still another variation of a liquid level sensor that utilizes the measurement of resistance as an indicator. Albin et al. does recognize the problem of shorts from the sensor tip to ground via a conductive path through sludge. However, the inventors claim that merely insulting the sensing rods except at the tip will eliminate this problem. Further, their device is quite complicated and expensive requiring the use of alternating current, an oscillator, and filters as well as other circuitry in order to achieve their objectives.

Therefore, a simple conductive-type of liquid level sensor for highly conductive fluids such as dishwasher soap that is easy and inexpensive to manufacture, can be attached in a variety of tanks and containers without substantial modification of those tanks and prevent false "full" indications due residue buildup is not found in the prior art.

SUMMARY OF THE INVENTION

It is an aspect of the invention to provide a liquid level sensor that prevents false "full" indications due to the buildup of residue on the inside of the container.

It is another aspect of the invention to provide a liquid level sensor that provides a virtual bias ring that is electrically charged the same polarity as the tip of the probe of the sensor so as to prevent a current path being established between probe tip and ground via any residue buildup on the probe or by the highly conductive nature of the liquid itself inside of the container.

It is an aspect of the invention to provide a liquid level sensor that can be used with any highly conductive liquid that has a level that needs to be determined, that is, where the liquid has a conductivity of approximately 50,000 micro-siemens/cm or greater that is experienced with typical dishwasher soap.

It is also an aspect of the invention to provide a liquid level sensor that can be used with a liquid having of conductivity of approximately 1,000 to 10,000 micro-siemens/cm.

It is still another aspect of the invention to provide a liquid level sensor that can be inexpensively manufactured.

Another aspect of the invention is to provide a liquid level sensor which is a conductive-type of design.

Still another aspect of the invention is to provide a liquid level sensor that is a load cell wherein the weight of the bottle and the liquid contained therein can determined.

It is an aspect of the invention to provide a liquid level sensor that can be used where the liquid and its container are not preferably in contact with an electrical ground.

Finally, it is an aspect of the invention to provide a liquid level sensor that works equally as well in conductive liquid situations which are either positively or negatively grounded by correspondingly adjusting the bias voltage of the probe virtual bias ring.

The invention is a liquid level sensor apparatus for determining the level of a conductive liquid held within a container having inside walls, one of which is an attachment wall, wherein the container is subject to the accumulation of residue as a consequence of the liquid contained therein. A housing which is attached to attachment wall of the container is provided. An insulated probe having an attachment end and a sensor end is also provided, wherein the attachment end of said insulated probe is connected to said housing such that the probe end is able to contact the conductive liquid held therein. A conducting sensor tip having a voltage is disposed at the probe end of said insulated probe. A ground connection having an electrical polarity, said ground connection is in contact with the conductive liquid. An exposed tip of a bias wire exits from said insulated probe positioned between said attachment end and said sensor end. A bias voltage at said exposed tip provides a virtual bias voltage circumferential ring around said insulated probe immediately adjacent to said exposed tip. The bias voltage of the virtual bias voltage circumferential ring has a polarity opposite of said ground connection wherein the bias voltage corresponds to the voltage of said conducting sensor tip. Once the liquid is in contact with said conducting sensor tip at a predetermined level, a circuit is completed to said ground connection which indicates a "full" condition. If the liquid is not in contact with said conducting sensor tip at the predetermined level, a "not full" condition is indicated. The bias voltage of said virtual circumferential ring prevents a false indication of a "full" condition by preventing the completion of the circuit from said conducting sensor tip to said ground connection via residue on the container walls and said insulated probe even when the liquid is not in contact with said conducting sensor tip. The container can be a standard container in which the high viscosity fluid is sold, having either a built-in sensor or a sensor that is a part of a replacement cap. The invention can be integrated with other technology relating to the system that the liquid level is being measured. The sensing invention can be added to any bottle with minimum cost so that standard bottles can be used as reservoirs for the highly viscous contents. A bottle holder can be provided which will fit within most appliances and machines. The bottle holder can have the necessary contacts and wire harness molded in.

DETAILED DESCRIPTION OF THE INVENTION

Figure 1:
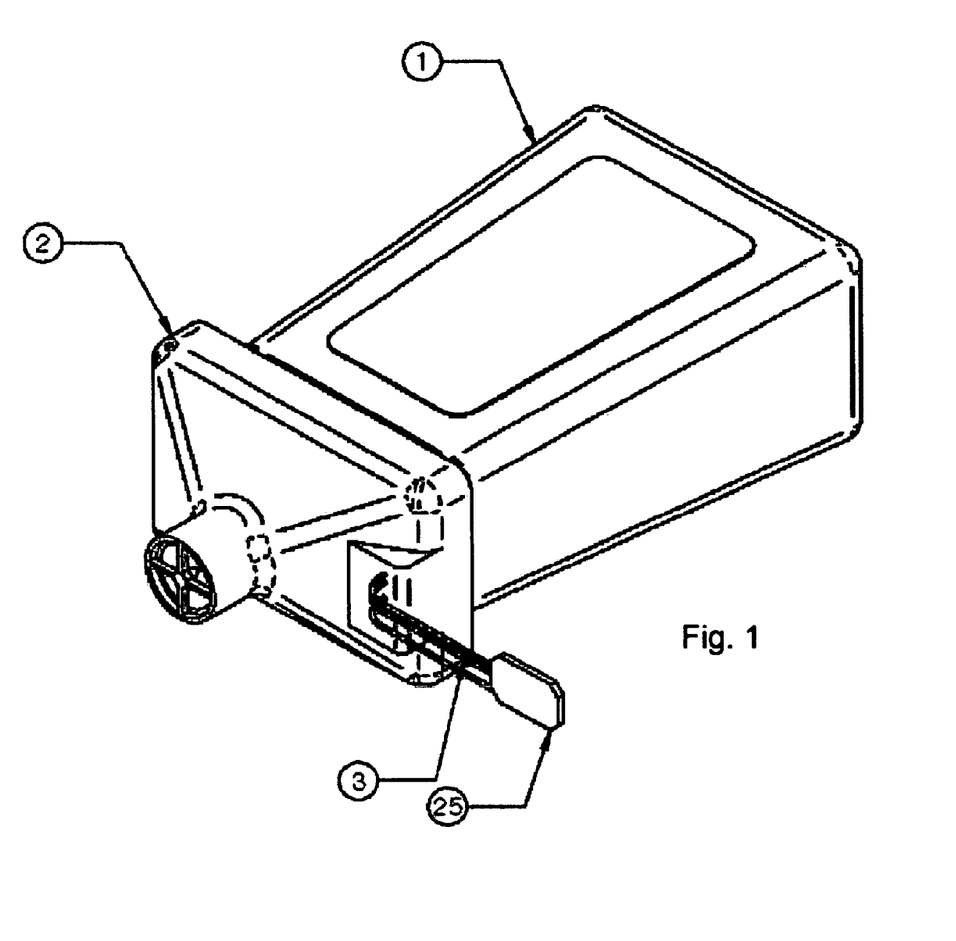
FIG. 1 is an illustration of the liquid level sensor using a standard bottle in accordance with the invention.

Referring first to FIG. 1, an illustration of the bottle 1 is placed in bottle holder 2 which is provided in the appliance. Holder 2 stays in the user's appliance. Its purpose is to hold the bottle 1 and also to pierce the bottle so that the contents therein can be released. In this manner, the user merely inserts the unopened bottle into the holder of the machine and the desired fluid is automatically released. Once the level of fluid has been used, the sensor via wires 3 to appliance electronics 25, which can be located at a distance from holder 2 or stored into holder 2 determines that fluid is needed and so notifies the user to provide a replacement of bottle of liquid.

For example, bottle 1 might contain dishwasher gel. Bottle 1 is then inserted into the user's dishwasher, the bottle is pierced by holder 2, and the gel is able to be dispensed as needed. Once the level of gel has fallen below the necessary minimum, a light or other signal device provided the dishwasher control panel alerts the user so that the expended bottle can be exchanged for a new one.

Figure 2:
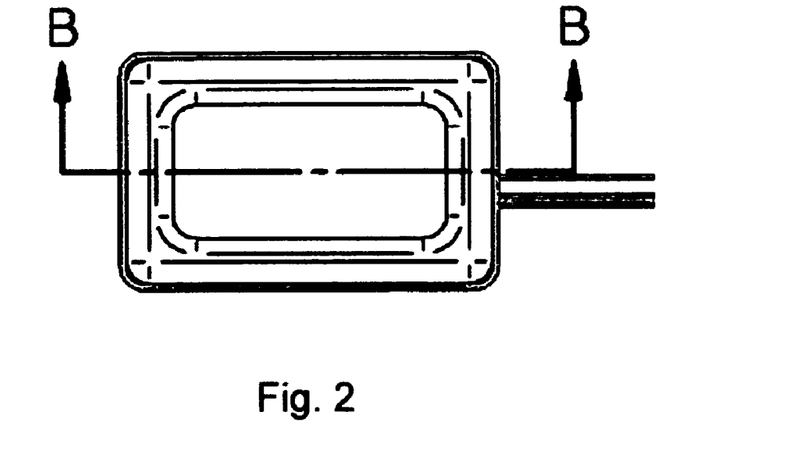
FIG. 2 is a cross-sectional view of the bottle and bottle holder showing the preferred embodiment.

As shown in FIG. 2, the preferred embodiment of the invention is illustrated. In this embodiment, bottle 4 has sensor 6 ultrasonically welded or molded in or pressed into the bottle so that the bottle and sensor probes and contacts are discarded one the contents of the bottle have been used. As noted above, bottle 4 is inserted into a holder 5. Sensor 6 via the probes indicate the level of fluid contained in the bottle using the technology as described in U.S. patent application Ser. No. 10/823,935 and its progeny, hereby incorporated in their entirety.

Figure 3:
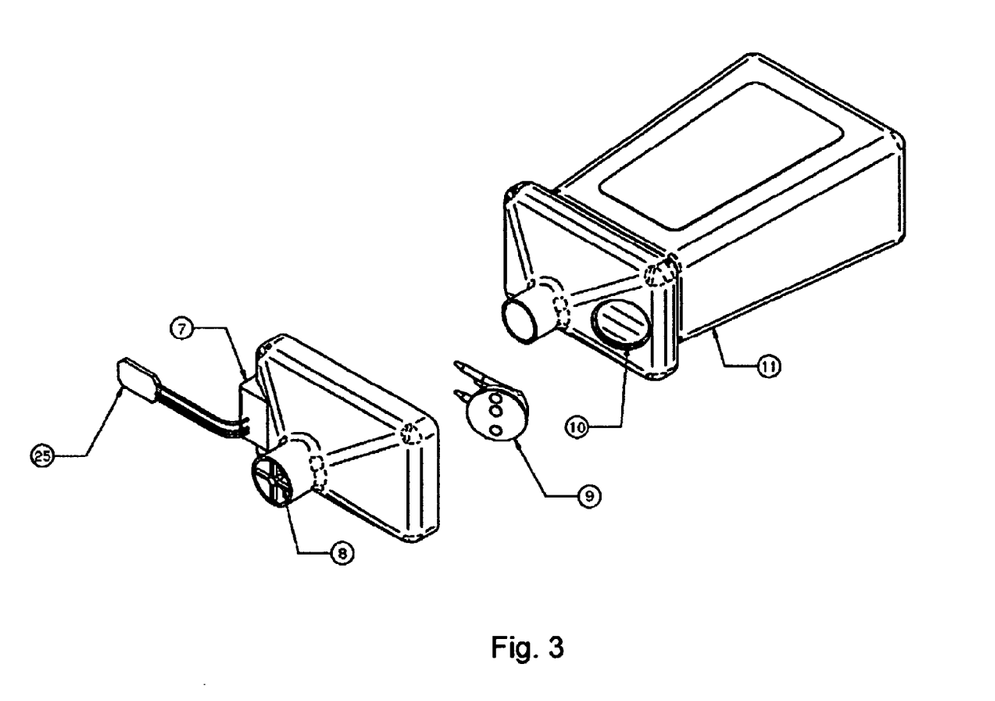
FIG. 3 is an exploded view of the bottle and bottle holder shown in FIG. 2.
Figure 4:
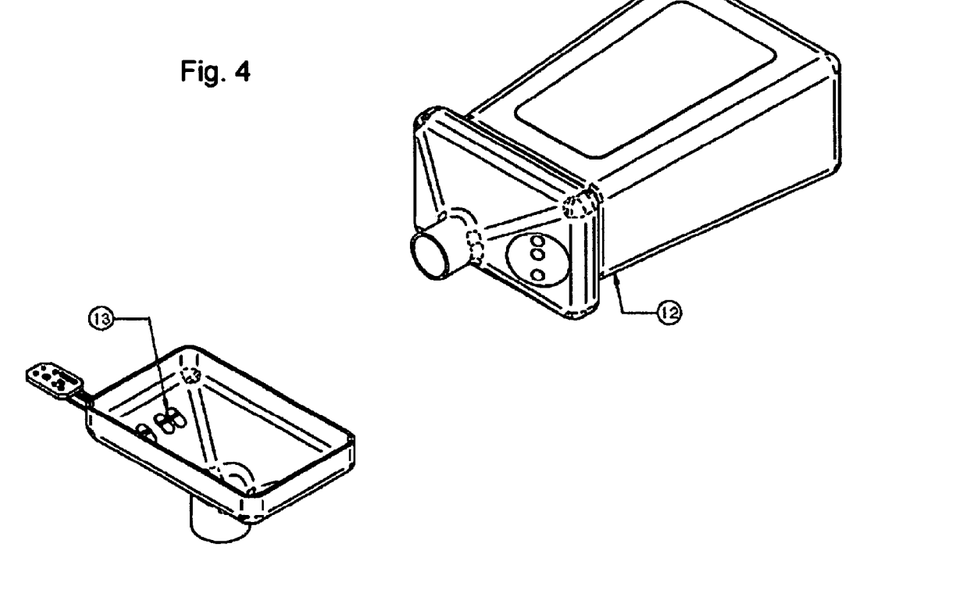
FIG. 4 is an illustration where the electronic contacts are molded into the bottle that contains the fluid.

Referring now to FIG. 3, an exploded view of the preferred embodiment is shown. Bottle 11 has a hole 11 that enables the sensor 9 with conducting buttons that will make contact with conducting compression springs 13 in the holder as shown in FIG. 4.

Figure 5:
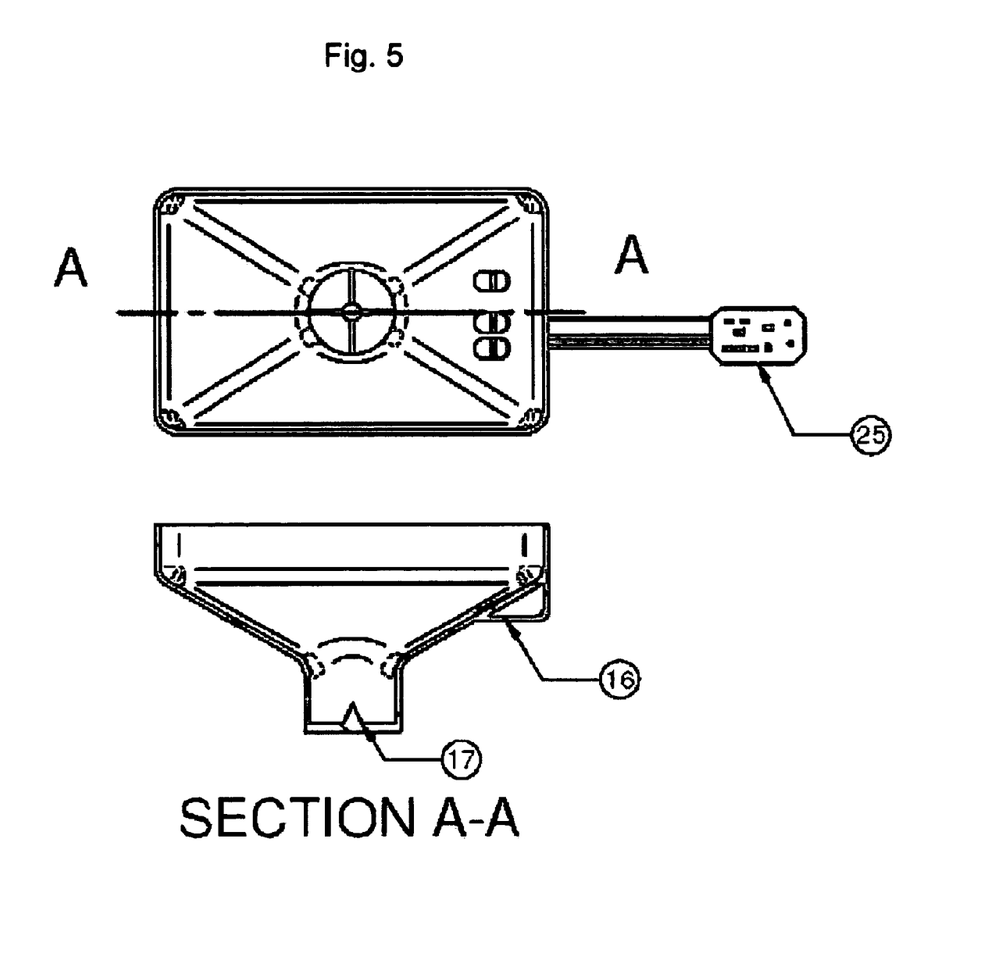
FIG. 5 is cross-sectional view of the alternative embodiment.

As shown in FIG. 3, the electronics 7 may be stored on the holder or integrated into the equipment electronics. Note that piercing mechanism 8 (shown in detail in FIG. 5, point 17) will allow the liquid to be released once the bottle has been pierced.

Figure 6:
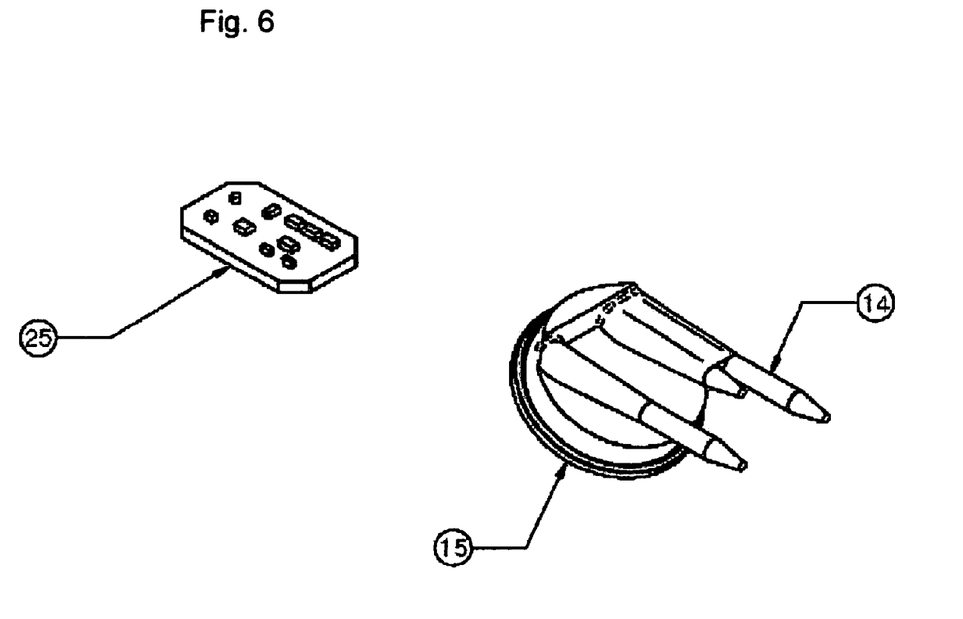
FIG. 6 is detailed view of the electronics and sensor probe which is molded into the bottle.

As shown in FIG. 6, a detail of the sensor probe 15 is provided. As noted above, sensor 14 is attached to the bottle along line 15.

Figure 7:
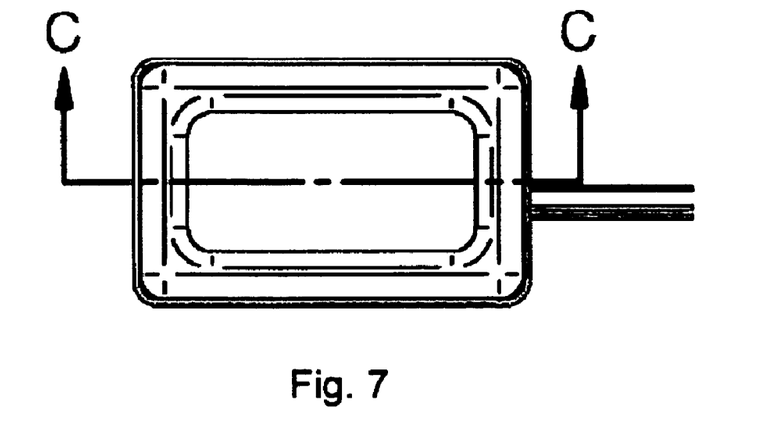
FIG. 7 is a detailed view of the alternative embodiment bottle assembly.
Figure 8:
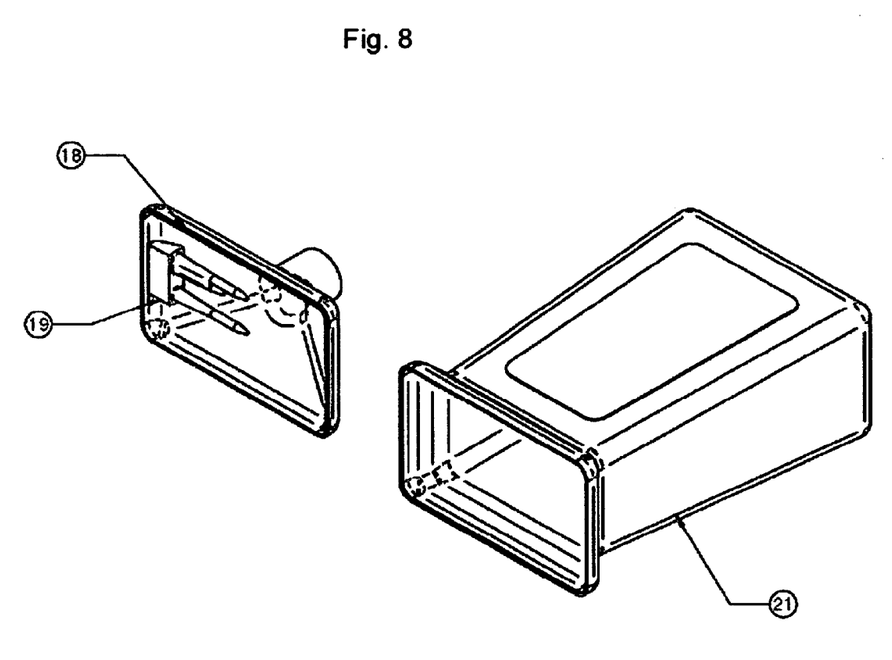
FIG. 8 is an illustration showing how the top half and bottom half are joined to form the alternative embodiment.
Figure 9:
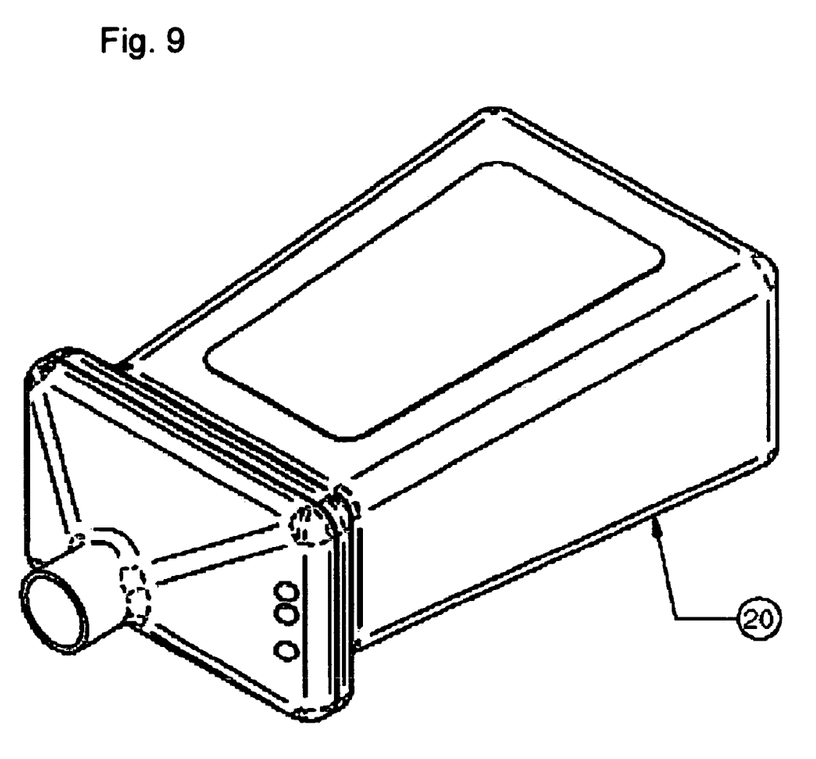
FIG. 9 illustrates the completed alternative embodiment bottle.

As shown in FIG. 7, an alternative embodiment of the bottle is shown. The holder is the same for both embodiments. As shown in FIG. 8, the bottle 21 has a top half 18 which has sensor 19 molded therein. Conducting buttons are on the outside of the bottle as in the preferred embodiment. The tope half 18 and the bottom half 21 are joined together to form the completed bottle. The cross-sectional view as shown in FIG. 7 looks the same as the preferred embodiment except for the fact that the bottle is fabricated in two parts for the alternative embodiment. As noted above, conducting buttons and the sensors can be replaced with small load cells, well known in the art, so that instead of measuring the liquid level using the technology described and claimed in the parent and sibling applications, the weight of the bottle and the contained liquid can be measured, thus indicating the amount of product still remaining.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. An apparatus for determining the level of a conductive liquid held within a bottle that is inserted into an appliance, said apparatus comprising:
    a holder having a piercing element for punching a hole in the bottle in order to release the contents of the bottle;
    electrical connection buttons attached to said holder wherein said electrical connection buttons connect said apparatus to the control circuitry of said appliance;
    a sensor having electrical connection buttons that mate with the electrical connection buttons on said holder;
    wherein said sensor comprises:
    an insulated probe having an attachment end and a sensor end, wherein the attachment end of said insulated probe is connected to said holder such that the probe end is able to contact the conductive liquid held therein;
    a conducting sensor tip having a voltage and disposed at the probe end of said insulated probe;
    a ground connection having an electrical polarity, said ground connection being in contact with the conductive liquid;
    an exposed tip of a bias wire which exits said insulated probe positioned between said attachment end and said sensor end such that a bias voltage at said exposed tip provides a virtual bias voltage circumferential ring around said insulated probe immediately adjacent to said exposed tip; wherein the bias voltage of the virtual bias voltage circumferential ring has a polarity opposite of said ground connection wherein the bias voltage corresponds to the voltage of said conducting sensor tip;
    wherein once the liquid is in contact with said conducting sensor tip at a predetermined level, a circuit is completed to said ground connection which indicates a "full" condition and wherein if the liquid is not in contact with said conducting sensor tip at the predetermined level a "not full" condition is indicated, and wherein the bias voltage of said virtual circumferential ring prevents a false indication of a "full" condition by preventing the completion of circuit from said conducting sensor tip to said ground connection via residue on the container walls and said insulated probe even when the liquid is not in contact with said conducting sensor tip.

2. The apparatus of claim 1 wherein said sensor further comprises a larger diameter region extending from the attachment end to the exposed tip of said bias wire which exits said sensor and a smaller diameter region extending immediately adjacent from the exit point of the exposed tip of said bias wire to conducting sensor tip such that the two different diameter regions of said sensor provide a shelf which tends to collect conductive liquid which assists in providing said virtual circumferential ring.

3. The apparatus of claim 2 wherein said larger and smaller diameter regions of said housing are integral with one another.

4. The apparatus of claim 2 wherein said first and second predetermined levels are substantially the same.

5. An apparatus for determining the level of a conductive liquid held within a bottle that is inserted into an appliance, said apparatus comprising:
    a holder having a piercing element for punching a hole in the bottle in order to release the contents of the bottle;
    electrical connection buttons attached to said holder wherein said electrical connection buttons connect said apparatus to the control circuitry of said appliance;
    a sensor having electrical connection buttons that mate with the electrical connection buttons on said holder;
    wherein said sensor comprises:
    at least one load cell that is responsive to the weight of the material contained with said bottle, such that the control circuitry of said appliance can determine the amount of liquid remaining in the bottle to indicate to a user when the bottle is empty.

* * * * *